P. T. LINDHARD.
PROCESS OF BURNING CEMENT AND OTHER MATERIALS.
APPLICATION FILED NOV. 2, 1907.
969,169.
Patented Sept. 6, 1910.
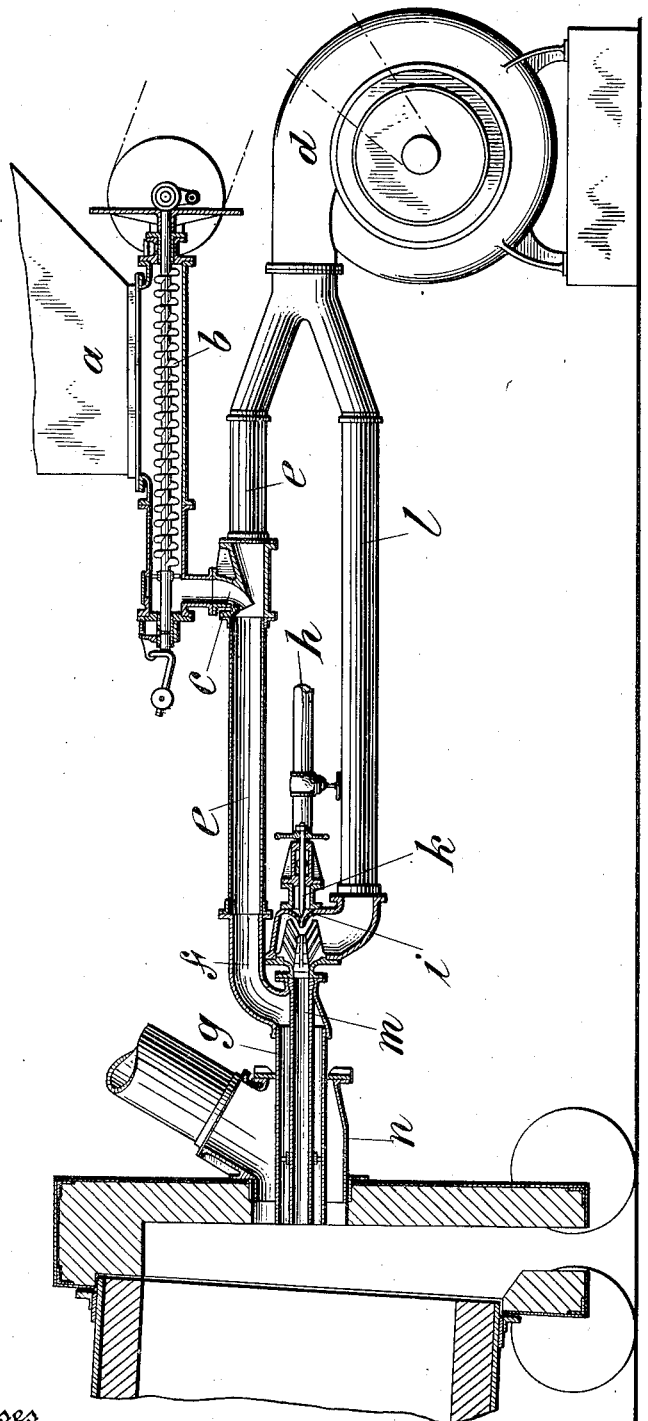

UNITED STATES PATENT OFFICE.

POVL T. LINDHARD, OF NEW YORK, N. Y., ASSIGNOR TO F. L. SMIDTH & CO., OF NEW YORK, N. Y., A CORPORATION OF NEW JERSEY.

PROCESS OF BURNING CEMENT AND OTHER MATERIALS.

969,169.  Specification of Letters Patent.  Patented Sept. 6, 1910.

Application filed November 2, 1907. Serial No. 400,359.

*To all whom it may concern:*

Be it known that I, POVL T. LINDHARD, a subject of the King of Denmark, and a resident of the borough of Manhattan of the city of New York, in the county and State of New York, have invented certain new and useful Improvements in Processes of Burning Cement and other Materials, of which the following is a specification.

In the burning of cement, it is well known that the employment of pulverized fuel renders the operation considerably more effective than the burning of cement with a gaseous fuel under like conditions. This fact seems to be due to the heat radiating from the zone of combustion of the pulverized fuel and impinging upon the cement materials. The cement materials upon which this radiant heat impinges are thus subjected to a considerable degree of heat even though they do not come in direct contact with the flame. In a kiln in which combustion is maintained by means of a gaseous fuel, the cement materials have to be heated solely by conduction, inasmuch as practically no radiation from a gaseous flame takes place, with the result that such materials as do not come within the range of the combustion zone, are not properly burned.

In many cases, the economy of production in a cement burning furnace could be considerably increased provided a gaseous fuel could be substituted, to some extent at least, for the now generally used pulverized carbonaceous fuel. For instance, in such cement burning plants, as are located in a region where natural gas abounds, or where cheap coal or lignite for gas producers exist, it would be possible to employ the gas derived from these sources and thus reduce considerably the cost of production of the cement.

The introduction of a small amount of pulverized fuel with a gaseous fuel, for instance, natural gas or producer gas, would also be beneficial in the way of regulating the fire in the furnace, which is very difficult to regulate with a gas flame, more particularly from a gas producer, while if a small amount of pulverized fuel was introduced with the gas flame the heat could be regulated mainly by changing the amount of pulverized fuel, which would enable the operator of the furnace to make quick changes in the temperature and condition of the fire and give him a far better control of the flame than is possible with the gas flame alone.

One object of the present invention is to provide a method of burning cement and other materials which shall produce a greater efficiency of operation or economy of production than it has been possible to attain heretofore. In accordance with the invention, the combustion is produced by means of a fuel composed of a gaseous fuel element, formed previously to its introduction into the kiln and a pulverized fuel element. The proportions of each of these fuel elements may obviously vary; but in order to obtain the maximum heating effect and the greatest economy at the same time, there should be the greatest possible proportion of gaseous fuel without decreasing the radiating effect which the use of pulverized fuel alone would have.

The invention also relates to improvements in the manner of introducing the fuel elements into a kiln or furnace and of combining them with air in order to support the combustion, and of regulating the combustion.

In carrying out the invention the pulverized fuel element may be introduced into a kiln or furnace around the gaseous fuel element, suitable means being provided to control the introduction of each fuel element whereby the proportions of the mixture constituting the combined fuel may be governed. Preferably the pulverized element is introduced into the furnace by a blast of air which entrains the same, and the gaseous fuel element is caused to entrain air by being introduced through an injector suitably formed for this purpose, whereby both fuel elements, as they are discharged into the furnace, are charged with a considerable amount of air. In addition to this it is preferable to introduce hot air into the furnace around the two fuel elements in order further to support the combustion. As the fuel elements are thus introduced, the gaseous fuel element will become more or less mixed with the pulverized fuel element and will cause the formation of a hot blue flame within the pulverized fuel element. This flame will help start the combustion of the pulverized fuel element and will cause the radiation to begin. Moreover, the heat from this flame will be transmitted by conduction to the pulverized fuel element and will be radiated thereby together with heat developed from the combustion of the pulverized element.

It will be understood that many variations may be made in the particular manner of introducing and of mixing the fuel elements referred to herein without departing from the invention. Moreover the improvements may be applied to metallurgical and other operations as well as to cement burning.

The accompanying drawing represents, partly in elevation and partly in section, an apparatus which is adapted for the carrying out of the process above described.

In the apparatus shown in said drawing the pulverized solid fuel is delivered from a hopper $a$ by a suitable feed screw $b$ to a pulverized fuel injector $c$. Air is supplied to the injector $c$ from a suitable fan $d$ through the pipe $e$ into which the injector projects, and the mixture of powdered coal and air travels through the continuation of the pipe $e$ and the pipe $f$ to the outer nozzle $g$ by which it is delivered into the kiln. The gas is delivered through a pipe $h$ to an injector $i$ controlled by a needle valve $k$. Air is delivered to the injector from the fan $d$ through a pipe $l$ and the mixture of gas and air is then delivered to the nozzle $m$ through which it is discharged into the furnace. The nozzle $m$ is surrounded by the nozzle $g$ and the latter is, in turn, surrounded by a housing $n$ to which hot air is supplied from any suitable source. There is thus supplied to the kiln a mixture of gas and air, a mixture of powdered coal and air surrounding the mixture of gas and air, and additional air around the mixture of powdered coal and air.

It will be understood that the invention is not limited to the particular apparatus shown and described herein.

I claim as my invention:—

The process of burning cement and other materials which consists in introducing into the kiln or combustion chamber a mixture of previously formed gas and air, a mixture of powdered coal and air around the mixture of gas and air, and additional air around the other two mixtures, to constitute the fuel of combustion.

This specification signed and witnessed this 31st day of October, A. D., 1907.

POVL T. LINDHARD.

Signed in the presence of—
LUCIUS E. VARNEY,
AMBROSE L. O'SHEA.